（12）United States Patent
Peretz et al.

(10) Patent No.: US 10,296,109 B2
(45) Date of Patent: May 21, 2019

(54) STYLUS FOR OPERATING A DIGITIZER SYSTEM (71) Applicant: Microsoft Technology Licensing, LLC, Redmond, WA (US)

(72) Inventors: Ahia Peretz, Ramat-Gan (IL); On Haran, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/008,008

(22) Filed: Jun. 13, 2018

(65) Prior Publication Data

US 2018/0292923 A1   Oct. 11, 2018

Related U.S. Application Data (62) Division of application No. 14/960,669, filed on Dec. 7, 2015, now Pat. No. 10,019,079.

(60) Provisional application No. 62/088,609, filed on Dec. 7, 2014.

(51) Int. Cl.
    *G06F 3/0354* (2013.01)
    *G06F 3/041* (2006.01)

(52) U.S. Cl.
    CPC .......... *G06F 3/03545* (2013.01); *G06F 3/041* (2013.01)

(58) Field of Classification Search
    CPC ................. G06F 3/03545; G06F 3/041–3/047
    See application file for complete search history.

(56) References Cited

U.S. PATENT DOCUMENTS

| | | | | |
|---|---|---|---|---|
| 8,773,405 B1* | 7/2014 | Ryshtun | ............... | G06F 3/03545 178/19.03 |
| 9,459,749 B1* | 10/2016 | Kremin | ............... | G06F 3/03545 |
| 2010/0006350 A1* | 1/2010 | Elias | .................... | G06F 3/03545 178/18.06 |
| 2011/0205191 A1* | 8/2011 | Hou | ..................... | G06F 3/03545 345/179 |
| 2012/0146958 A1* | 6/2012 | Oda | ..................... | G06F 3/03545 345/179 |
| 2013/0106760 A1* | 5/2013 | Pedersen | ............. | G06F 3/03545 345/174 |
| 2014/0028576 A1* | 1/2014 | Shahparnia | ........... | G06F 3/0416 345/173 |
| 2015/0309599 A1* | 10/2015 | Michihata | ........... | G06F 3/03545 345/174 |
| 2016/0116997 A1* | 4/2016 | Kim | .................... | G06F 3/03545 345/174 |

FOREIGN PATENT DOCUMENTS

JP       2014234104 A      12/2014

* cited by examiner

Primary Examiner — Gene W Lee (57) ABSTRACT

A handheld device includes a conductive tip configured to interact with a capacitive based digitizer sensor, an active transmission module, a reflective transmission module, a switch configured to connect the conductive tip to one of the active transmission module and the reflective transmission module and a controller configured to toggle position of the switch. The active transmission module configured to generate a first signal on the conductive tip independent from a drive signal transmitted on the digitizer sensor. The reflective transmission module is configured to generate a second signal on the conductive tip based on the drive signal transmitted on the digitizer sensor and picked by the conductive tip during interaction with the digitizer sensor.

14 Claims, 8 Drawing Sheets

STYLUS FOR OPERATING A DIGITIZER SYSTEM

RELATED APPLICATIONS

This application is a divisional and claims the benefit of priority of U.S. Non-Provisional patent application Ser. No. 14/960,669 filed on Dec. 7, 2015, which claims priority to U.S. Provisional Patent Application No. 62/088,609 filed on Dec. 7, 2014, the contents of which are both incorporated by reference herein in their entireties.

BACKGROUND

Signal emitting styluses, e.g. active styluses are known in the art for use with a digitizer system. Position detection of the stylus provides input to a computing device associated with the digitizer system and is interpreted as user commands. In some known systems, position detection is only performed while the stylus tip is touching a detection surface of the digitizer system. In other known systems, position detection is also performed while the stylus tip is hovering over the detection surface. Typically, hover and touch input is interpreted differently. Often, the digitizer system is integrated with a display screen, e.g. to form a touch screen. Position of the stylus over the screen is correlated with virtual information portrayed on the screen.

Digitizer systems track free style input provided with a finger, conductive object. Optionally, digitizer systems also support tracking signal emitted by a stylus. A mutual capacitive sensor is one type of digitizer sensor for a digitizer system. Mutual capacitive sensors typically include a matrix formed with parallel conductive material arranged in rows and columns with a capacitive connection created around overlap and/or junction areas formed between rows and columns. Bringing a finger or conductive object close to the surface of the digitizer sensor changes the local electrostatic field and reduces the mutual capacitance between junction areas in the vicinity. The capacitance change at junctions on the grid is detected to determine location of the finger or conductive object on the capacitive sensor. The capacitance change is determined by applying a signal along one axis of the matrix while sampling output on the other axis to detect a coupled signal. Mutual capacitive detection allows multi-touch operation where multiple fingers, palms or conductive objects can be tracked at the same time.

A signal emitting stylus is typically detected and tracked by a digitizer system over a period that is not being used for mutual capacitive detection. A signal emitted by a stylus is typically detected and tracked by sampling output from both axes of the digitizer sensor to identify. Input detected on row and columns of the sensor is used to define coordinates of stylus interaction.

SUMMARY

The disclosure in some embodiments relates to a universal type stylus or other handheld device that may be used with a multiplicity of digitizer system types, and not necessarily with a digitizer system that is specifically adapted to communicate with the stylus. In particular, the universal stylus may be used with any digitizer system that supports touch of a conductive object such as a finger or another body part and without specific knowledge of detection techniques applied by a manufacturer of the digitizer system.

The universal stylus according to embodiments of the present disclosure may be a personal tool that can be used with different touch enabled devices purchased before or after the stylus was purchased and without requiring any specific adaption or updating by the computing device or by the stylus. The stylus operates by picking up charge from a drive signal transmitted on the digitizer sensor for detecting touch, converting the charge to voltage, amplifying the voltage and optionally inverting the signal. Such a stylus may be referred to as "reflective capacitive stylus" and the voltage induced may be referred to as a reflective signal. In some exemplary embodiments, information such as tip pressure and stylus identity is encoded in the reflective signal.

The universal stylus according to additional embodiments of the present disclosure also includes active signal transmission capability for communicating with some digitizer system that supports stylus detection. Active signal transmission capability is in addition to the reflective transmission capability that allows the stylus to interact with many different types of digitizer systems. Toggling between reflective transmission and active signal transmission may be on demand or based on a predefined protocol.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

A stylus according to some aspects of the present disclosure includes a circuit connected to its tip that can pick up charge from drive lines of a digitizer sensor during mutual or self capacitive detection and produce a voltage at the tip that mimics finger touch input. Optionally, the voltage pattern is a signal that is destructive to the drive signal, e.g. a voltage pattern with opposite phase with respect to the signal picked up by the tip. Alternatively, the voltage pattern may be selected to be constructive or partially constructive to the drive signal. Constructive input can mimic input from a floating conductive object and provide for distinguishing between finger touch input and stylus input. The circuit includes a varying gain component that is either controlled by the circuit and/or controlled by a user controlled button. The variable gain component provides for adjusting the dynamic range of the output to range that can be detected by the digitizer sensor. Typically, the variable gain component is also adapted to prevent self-oscillation of the circuit.

The circuit according to some other embodiments of the present disclosure imposes modulation on the voltage produced on the tip to distinguish stylus input from finger input. Optionally, the circuit produces a voltage on the tip that mimics input from a floating conductive object as opposed to a ground fingertip. Optionally, the circuit is adapted to encode information such as tip pressure and a stylus identity on the reflected signal, e.g. the voltage produced on the tip. Some digitizer systems or computing devices may be updated to support detection and decipher modulations imposed on the signal at low cost.

The circuit according to some aspects of the present disclosure includes digital component that samples the signal picked up by the tip over a first time period and then generates a reflected signal based on the signal sampled. In some exemplary embodiments, the digital components encode information on the reflected signal such as the tip pressure and stylus identity code.

According to some additional aspects of the present disclosure, the stylus is a hybrid stylus that can operate in two different transmission modes. The first transmission mode is a reflective transmission mode that is initiated by drive signals transmitted on the digitizer sensor during mutual or self capacitive detection. This mode is the universal mode that is suitable for interaction with different types of digitizer systems. This mode can be applied to detect a stylus that is touching or closely hovering over the digitizer sensor. The second transmission mode is an active transmission mode where the stylus generates and transmits its own signal, e.g. an autonomous signal, independent from the drive signals transmitted on the digitizer sensor. Optionally, during an active transmission mode, the stylus is synchronized with the digitizer system to transmit its signal over a period that is not being used for mutual capacitive detection. The second mode is suitable for digitizer systems that are specifically tuned to receive stylus generated signals and can be applied to detect a stylus that is touching and hovering over a range of heights. Typically, one of the two transmission modes is selected based on a defined working environment.

The reflective transmission mode may provide basic functionality when used with any digitizer system and does not require the digitizer system to recognize the stylus. However, when the stylus is used with a digitizer that is adapted to receive the autonomous signals generated by the stylus, the active transmission mode may be activated to provide superior performance and additional features. For example, the active transmission mode may be operated to improve detection during hovering of the stylus, to report tip pressure, or to report an identity code of the stylus.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1:
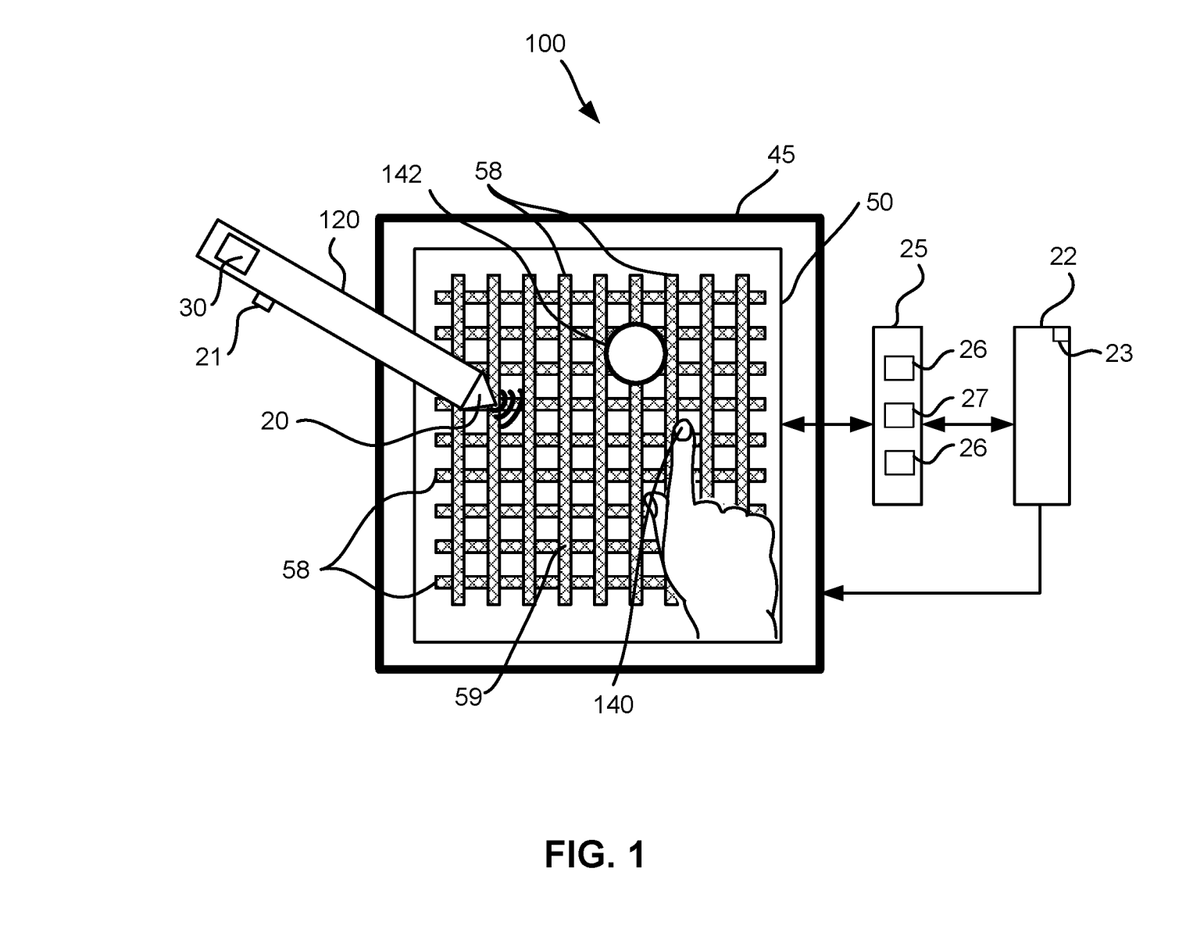
FIG. 1 is a simplified block diagram of an exemplary computing device including a digitizer system in accordance with some embodiments of the present disclosure.

FIG. 1 is a simplified block diagram of an exemplary computing device including a digitizer system in accordance with some embodiments of the present disclosure. A computing device 100 may be a mobile computing device that includes a digitizer sensor 50 integrated with an electronic display 45, e.g. flat panel display (FPD). Examples of such devices include tablet PCs, touch enabled lap-top or tabletop computers, a person digital assistant (PDA) and mobile phones.

Digitizer sensor 50 typically includes a patterned arrangement of conductive strips 58 or lines that are optionally arranged in a grid including row and column conductive strips 58, also referred to as antennas, traces, lines, or conductors. Digitizer sensor 50 is also typically formed with transparent material that is overlaid or integrated with display 45.

A circuitry 25 for operating digitizer sensor 50 may include one or more analog application specific integrated circuit (ASICs) 26 and one or more digital ASIC units 27 adapted to sample and process output from digitizer sensor 50. Output from circuit 25, e.g. from digital ASIC unit 27 may be reported to a host 22 via an interface to relay information to relay information to the operating system or any current application. Optionally, information reported to host 22 is further processed.

Typically, a mutual capacitive detection method is applied by circuit 25 to detect one or more fingertip touches 140. During mutual capacitive detection, circuit 25 transmits a triggering pulse or a drive pulse on conductive strips 58 along one axis of digitizer sensor 50 (drive lines) and samples output on conductive strips 58 along the other axis of digitizer sensor 50 (receive lines). Optionally, the triggering pulse is an AC pulse signal with frequency of 10-500 KHz. Mutual capacitive detection is typically applied to detect and track one or more fingertips 140 interacting with digitizer sensor 50 by touch. The presence of fingertip 140 drains current from the lines to ground and thereby decreases amplitude of a signal coupled on touched receive lines. Typically, amplitude is decreased by about 15-30% due to finger touch. This finger effect (FE) is detected by circuit 25 and used to determine coordinates of touch. Optionally, a finger hovering at a height of about 1-2 cm above the display can also be detected by circuit 25.

Circuit 25 may also be adapted to detect and track one or more conductive objects 142 on digitizer sensor 50 based on mutual capacitive detection. Typically, the presence of conductive object 142 on or near a drive line increases amplitude of a signal coupled on receive lines that are touched since the conductive object 142 is typically floating. Optionally, circuit 25 is adapted to detect both a threshold increase in amplitude and a threshold decrease in amplitude. Typically, the increase and decrease in amplitude is with respect to base-line amplitude detected on receive lines when no object is interacting digitizer sensor 50.

According to some exemplary embodiments, stylus 120 is adapted operate in a reflective transmission mode. In this mode, tip 20 of stylus 120 picks up charge from drive signals transmitted during mutual capacitive detection, converts the charge to a voltage and imposes or reflects input to digitizer sensor that mimics finger touch input. In this manner, stylus 120 can be used with any digitizer sensor that applies mutual capacitive detection to track fingertip input. Optionally, stylus 120 is also adapted to impose input that mimics input from a floating conducting object. Typically, a signal produced by stylus 120 either increases or decrease amplitude of the coupled signal on the receive line of the digitizer sensor in a range that can be detected by circuit 25. Mutual capacitive detection provides for tracking coordinates of stylus 120 based on output sampled from receive lines. Optionally, a same method tracks input from the stylus.

According to some exemplary embodiments, stylus 120 also includes active transmission capability. During an active transmission mode, stylus 120 generates and transmits its own signal, e.g. an autonomous signal, independent from the drive signals transmitted on the digitizer sensor. Optionally, stylus 120 transmits pulse signals at a defined repetition rate. In some exemplary embodiments, circuit 25 is adapted to detect input from stylus 120 by periodically sampling output from both row and conductive strips 58. Optionally, circuit 25 includes a dedicated time frame for detecting signals transmitted by stylus 120 that is other than the time frame during which mutual capacitive detection is performed.

Stylus 120 may toggle between a reflective transmission mode and an active transmission mode responsive to selection by a user with button or dial 21, based on a defined protocol, based on a signal received from circuit 25 via tip 20 of stylus 120 and/or based on input received from computing device 100 via wireless transmission. Optionally, stylus 120 includes a wireless communication module 30, e.g. applying Bluetooth communication to communicate with a corresponding wireless communication module 23 of host 22.

Figure 2:
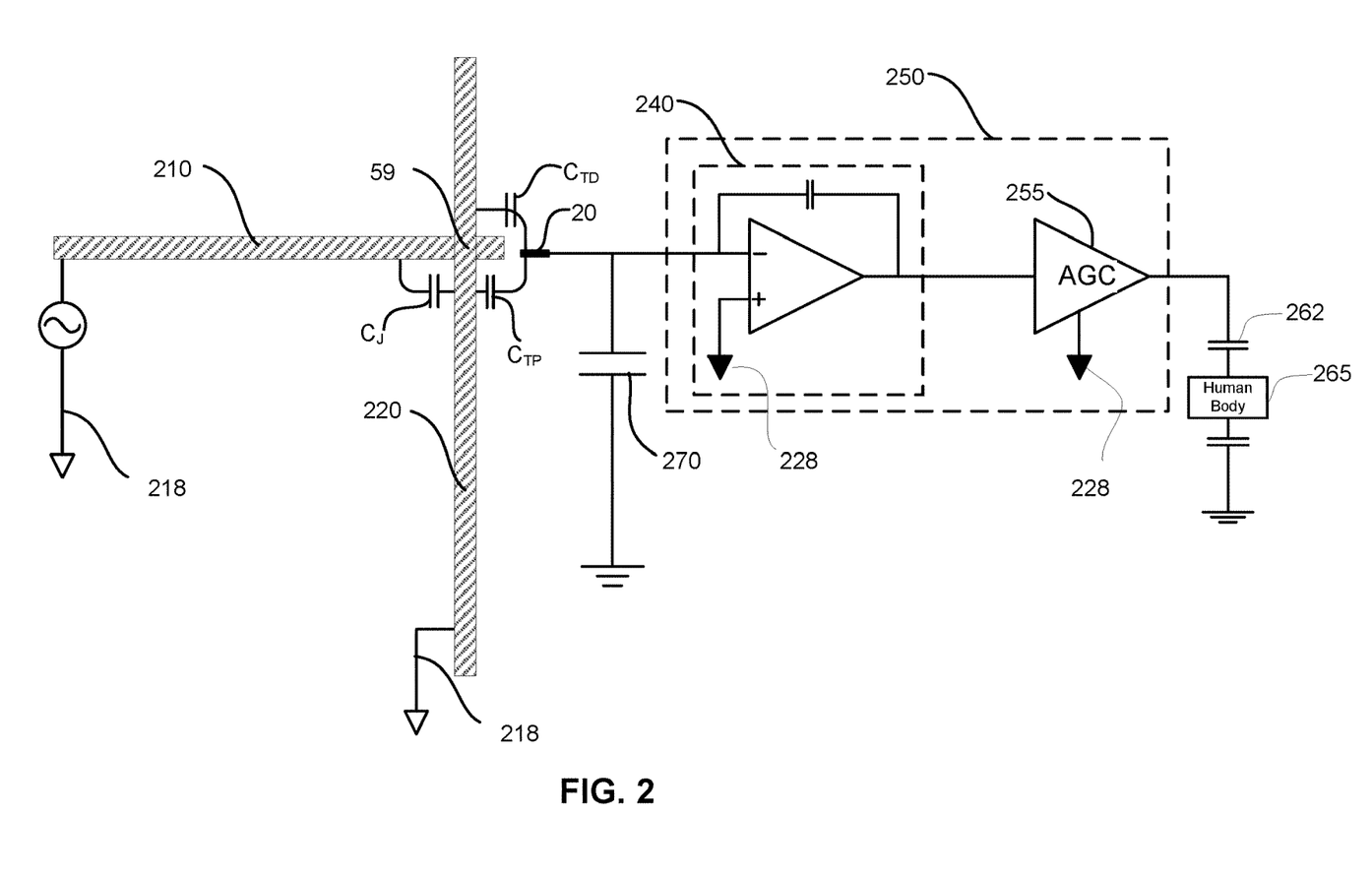
FIG. 2 is a simplified diagram of an exemplary stylus circuit connected to a tip of the stylus and capacitive connectivity of the tip with a junction in a grid based digitizer sensor in accordance with some embodiments of the present disclosure.

Reference is now made to FIG. 2 showing a simplified diagram of an exemplary stylus circuit connected to a tip of the stylus and capacitive connectivity of the tip with a junction in a grid based digitizer sensor in accordance with some embodiments of the present disclosure. The capacitive link that governs mutual capacitive detection of the stylus includes junction capacitance $C_J$ between a drive line 210 (row conductive strip 58) and a receive line 220 (column conductive strip 58) at junction 59, capacitance $C_{TD}$ between tip 20 of stylus 120 and drive line 210 and capacitance $C_{TP}$ between tip 20 of stylus 120 and receive line 210. Typically, both drive line 210 and receive line 220 are connected to system ground 218. Only a single drive line and a single receive line are shown for simplicity purposes.

Due to a potential difference between drive line 210 and tip 20, current flows from drive line 210 to tip 20. Charge accumulated on tip 20 due to coupling with drive line 210 is transformed by circuit 250 of stylus 120 to voltage which is then coupled to drive line 210 and receive line. The coupled voltage changes amplitude of the signal detected on receive line 220 during mutual capacitive detection.

The capacitive link between tip 20 and digitizer sensor 50 can vary significantly as tip 20 moves between junctions and can also vary significantly for different digitizer sensors. Differences in capacitance between different digitizer sensors can be due to different layers thicknesses used for the digitizer sensors, different dielectric coefficients, and different antenna designs. Typically, the large variation in capacitance compromises performance and sensitivity of a universal stylus. In some exemplary embodiments, circuit 250 provides compensation for such variations by adjusting the gain of the circuit based on the input received.

Circuit 250 includes a transimpedance amplifier (TIA) 240 in series with an automatic gain controller (AGC) 208. AGC 28 is typically associated with a reference voltage based on which the gain is adjusted to provide a stable output for varying input. A floating power supply, operatively connected to tip 20, provides power to amplifier 220 and AGC 208.

While each of amplifier AGC 208 and amplifier 220 is connected to stylus ground 228, output from AGC 208 is connected a conductive portion of stylus 120 that connects to earth ground via a user 265 holding the stylus. Optionally, connection to system ground is via capacitor 262 representing impedance due to an optionally non-conductive coating separating the user from the stylus frame or housing. The difference in the grounding states leads to oscillation of stylus ground 228 with a 180 degree phase shift as compared to the signal picked up at tip 20. Therefore, the voltage $V_{tip}$ at tip 20 is inversely proportional to the input signal and is defined by $$V_{tip} = -V_{touch} * G, \quad \text{Equation (1)}$$

wherein G is the amplification factor.

The gain defined by AGC 208 varies to compensate for large discrepancies in amplitude of the input signal due to changes in position of tip 20 with respect to junction 59 and also to adjust amplitude of input for a particular digitizer system due to is physical properties. Optionally, AGC 208 provides a constant or stable output in response to varying input.

AGC 208 is also adapted to avoid or reduce positive feedback oscillation through capacitance 232 between tip 20 and the system ground. The positive feedback oscillation is inherent in circuit 250 since tip 20 simultaneously receives and transmits a signal.

Imposing and inverted voltage on tip 20 or reflecting the input signal on drive line 210 with a 180 degree phase shift reduces the current flow and provides the finger touch effect (FE) that can be detected by digitizer circuitry. The current flowing from drive line 210 to receive line 220 is reduced by the current flowing to tip 20. Current is drawn to tip 20 due to the potential difference between tip 20 and drive line 210 and tip 20 and receive line 220. Alternatively, a floating conductive object touch effect can be produced by imposing a voltage on tip 20 that is in the same phase as the drive signal on the drive line of the digitizer sensor. Optionally, modulations can be imposed by changing the phase of the signal on tip 20 with a defined pattern.

Optionally, circuit 250 provides relatively stable touch effect on receive line 220 with reduced dependency on the design and operation parameters of the digitizer sensor. In addition, smooth capacitance changes may be detected in response to movement of tip 20 away from a junction 59.

In alternate embodiments stylus 120 additional includes a ring electrode that capacitively couples to digitizer sensor 50. Optionally, one of the tip or ring electrode is used to pick up signals from digitizer sensor 50 and the other is used to transmit a signal. The finger touch effect can be produced by switching the phase between the receiving and transmitting electrodes.

Figure 3:
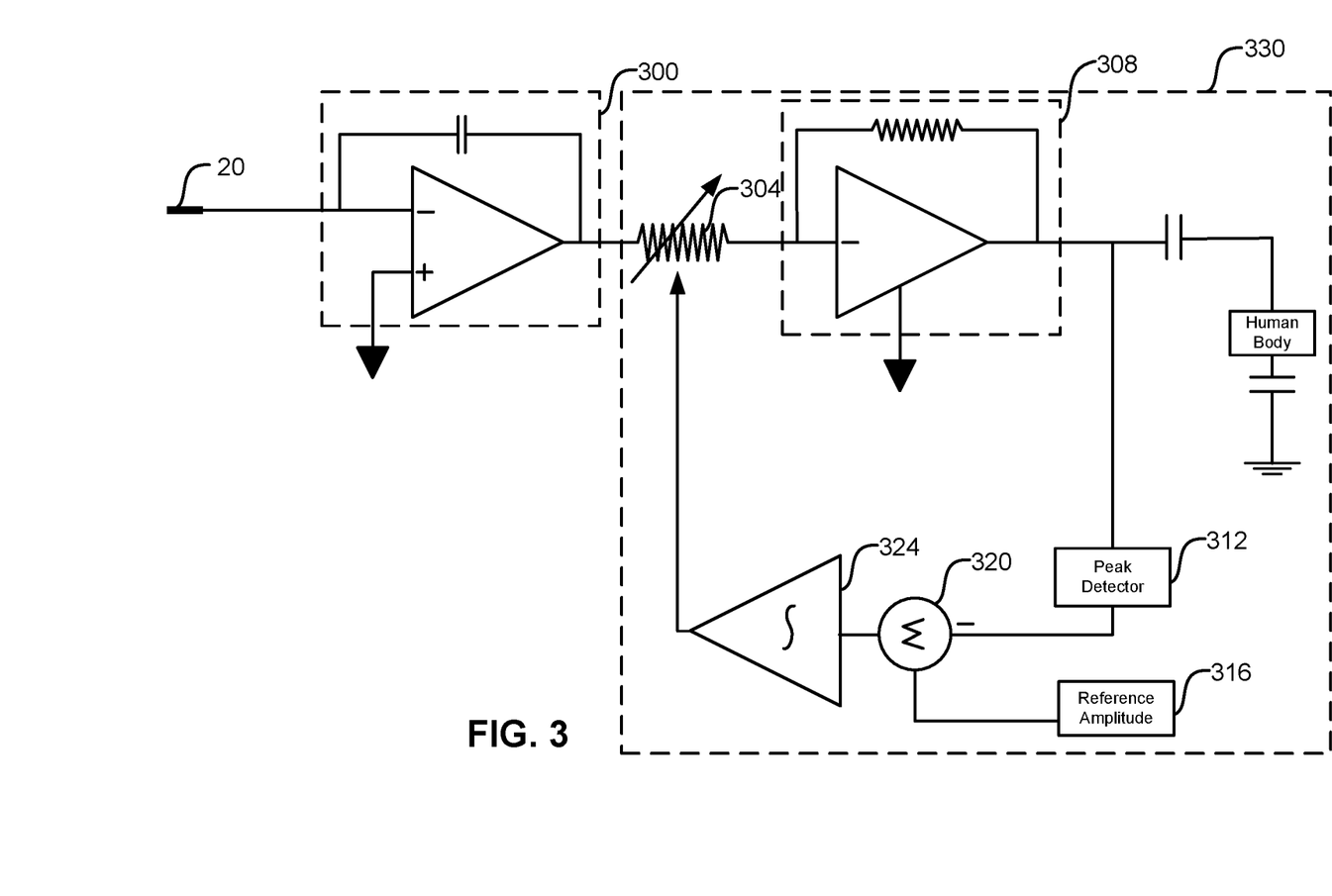
FIG. 3 is a simplified diagram of the exemplary stylus circuit of FIG. 2 shown in more detail in accordance with some embodiments of the present disclosure.

Reference is now made to FIG. 3 showing a simplified diagram of the exemplary stylus circuit of FIG. 2 shown in more detail in accordance with some embodiments of the present disclosure. In some exemplary embodiments, the stylus circuit includes TIA 240 together with a voltage controlled attenuator (VCA) 304 that inverts an input signal and changes its attenuation. An amplitude detector 312 together with an adder 320 and integrator 324 controls VCA 304 so that amplitude of amplifier 308 matches reference amplitude 316. The touch effect in this exemplary circuit is proportional to the ratio between the tip and junction capacitances. The tip voltage ($V_{tip}$) is proportional to the input signal ($V_g$) with inverse phase.

$$FE = G * \frac{C_{tip}}{C_J}, \text{ where } G = const \quad \text{Equation (2)}$$

$$V_{tip} = -V_g = -V_{touch} * G \quad \text{Equation (3)}$$

Where:

$C_{tip}$ is the tip and a touched conductive strip of the digitizer sensor;

$V_{tip}$ is amplitude of an excitation voltage on tip 20; and $V_{touch}$ is amplitude of the excitation voltage as detected from the receive line.

$V_{tip}$ while the tip 20 is on a conductive strip 58 may be about 80 fF, while the tip capacitance when the tip is between junctions or between parallel conductive strips may be about 30 fF. Given a typical junction capacitance of 600 fF, the stylus effect is about 44% when tip 20 is on junction 59 and about 16% when between junctions.

If a simple inverting amplifier is used instead of AGC 208 implemented as circuit 330, the stylus effect may vary significantly, e.g. 49% on a junction and about 1.2% between junctions. This extensive dynamic range would be difficult to track and may lead to inaccuracies in detection stylus position.

Figure 4:
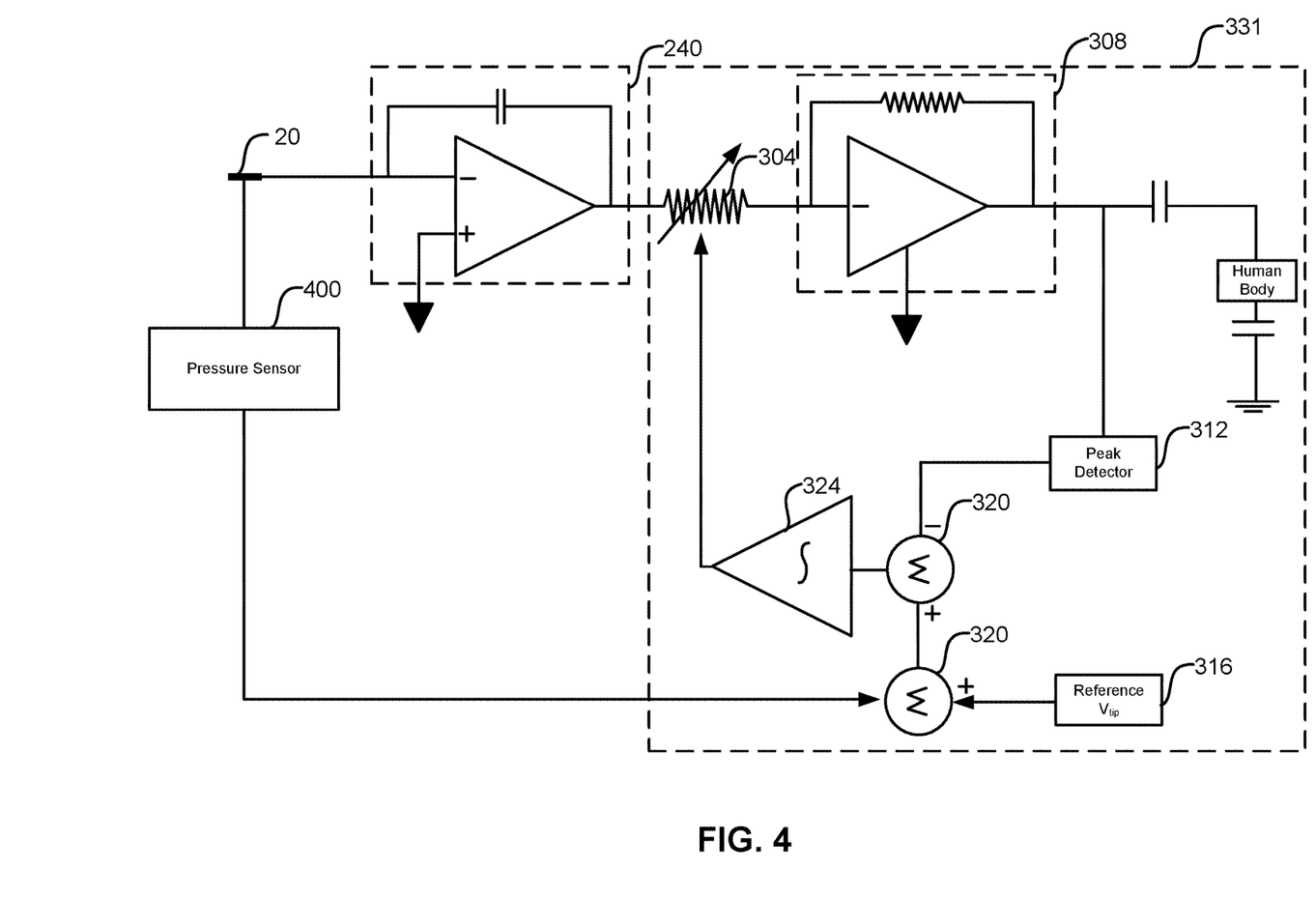
FIG. 4 is a simplified exemplary circuit for a stylus that produces a finger touch effect that is proportional to pressure applied on the tip in accordance with some embodiments of the present disclosure.

Reference is now made to FIG. 4 showing a simplified exemplary circuit of stylus for producing a finger effect on a digitizer sensor that is proportional to pressure applied on the tip in accordance with some embodiments of the present disclosure. Stylus circuit 331 may optionally be based on circuit 330 and include many of the same components. In some exemplary embodiments, tip 20 is physically connected or associated with a pressure sensor 400 that changes its voltage based on pressure applied on tip 20 as when writing with stylus 120. Optionally, pressure sensor 400 includes a variable capacitor that is sensitive to axial displacement of the tip when pressure is applied on the tip. In some exemplary embodiments, stylus circuit 331 uses pressure sensor 400 to modulate $V_{tip}$, e.g. impose amplitude modulation according to the detected pressure. Output from pressure sensor 400 is added to a reference $V_{tip}$ with an adder 320. The finger effect produced by circuit 331 may be governed by the following relationship:

$$FE = \frac{V_{reference} \mp V_{Pressure}}{V_{touch}} * \frac{C_{tip}}{C_{junc}} \quad \text{Equation (4)}$$

Where $V_{pressure}$ is the voltage detected from pressure sensor 400.

Figure 5:
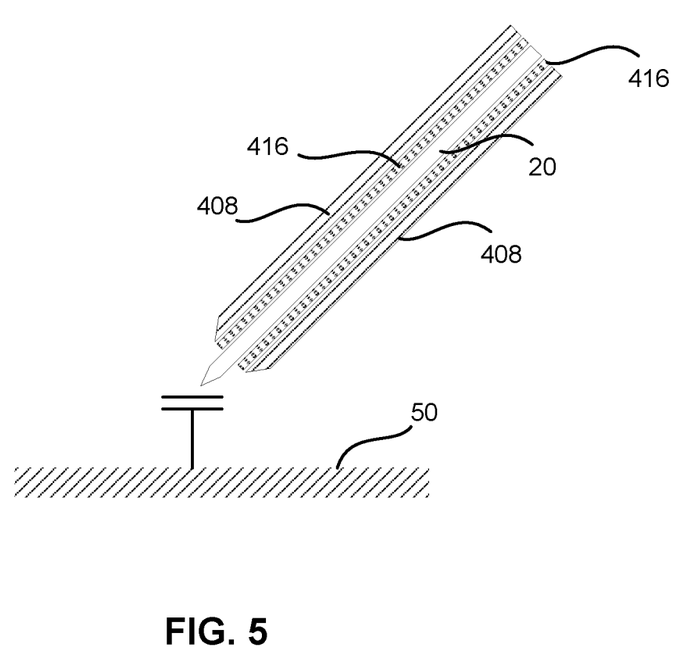
FIG. 5 is a simplified schematic drawing of a stylus tip with shielding in accordance with some embodiments of the present disclosure.

Reference is now made to FIG. 5 showing a simplified schematic drawing of a stylus tip with shielding in accordance with some embodiments of the present disclosure. Stylus 120 is typically held by a user at an angle other than 900 to the digitizer. Due to the angle, tip 20 may create capacitance with the sensor along the projection of the tip and not only on its distal end. This may create parallax and shift of the touch point, which may lead to suboptimal results. In order to prevent this phenomenon, a conductive shield housing 408 which connects to the earth ground may be added, which "hides" most of tip 20 from digitizer sensor 50 and reduces the parallax. However, shield housing 408 may increase the capacitance between tip 20 and the earth ground, which may create positive feedback and instability as detailed above. In order to decrease this capacitance, stylus ground shield 416, which may be connected to the stylus ground may be added between tip 204 and conductive shield housing 408. Stylus ground shield 416 thus prevents the capacitance between tip 20 and shield housing 408, and provides for using the stylus while reducing the parallax effect.

Figure 6:
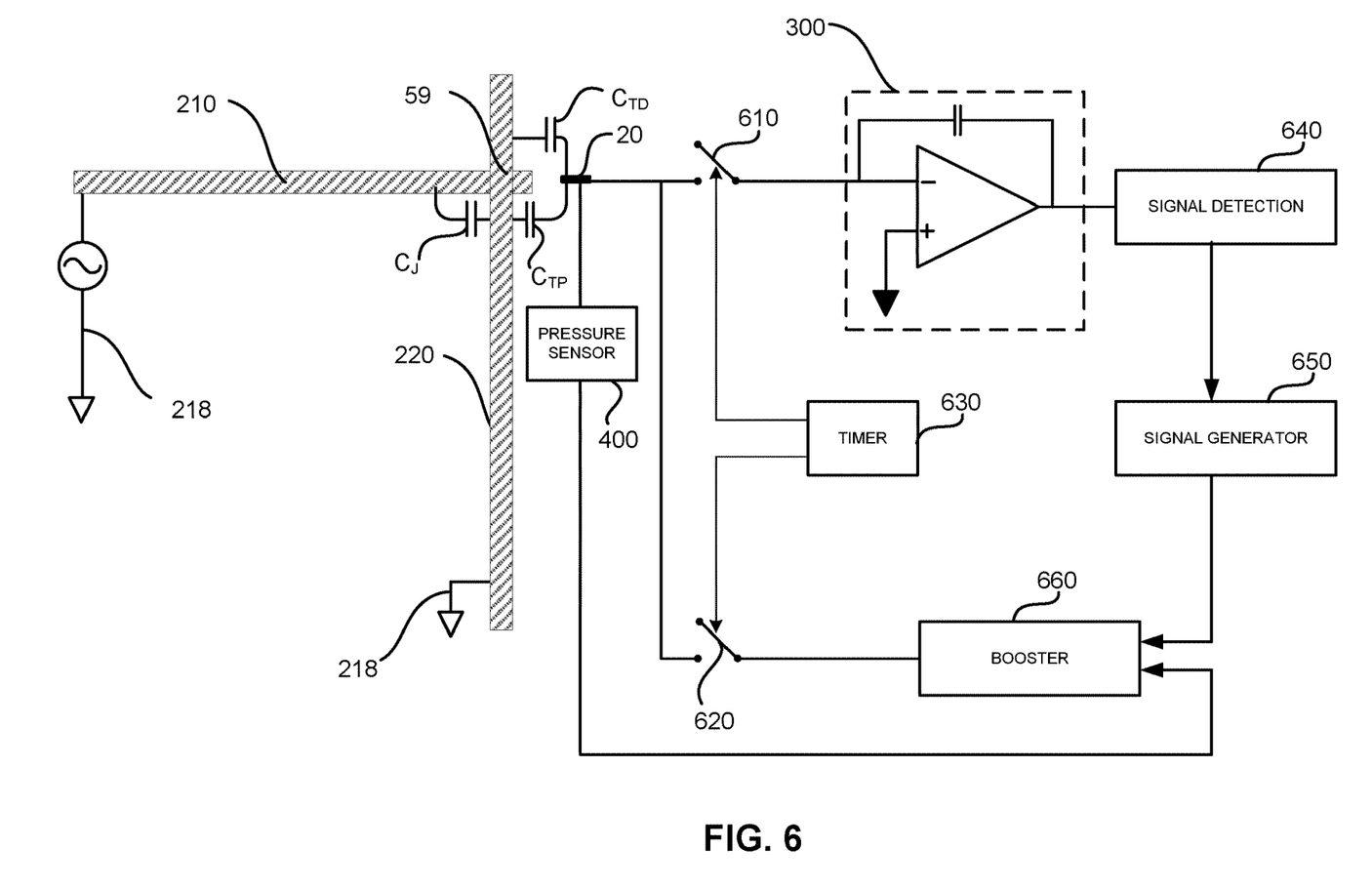
FIG. 6 is a simplified diagram of another exemplary stylus circuit connected to a tip of the stylus in accordance with some embodiments of the present disclosure.
Figure 7:
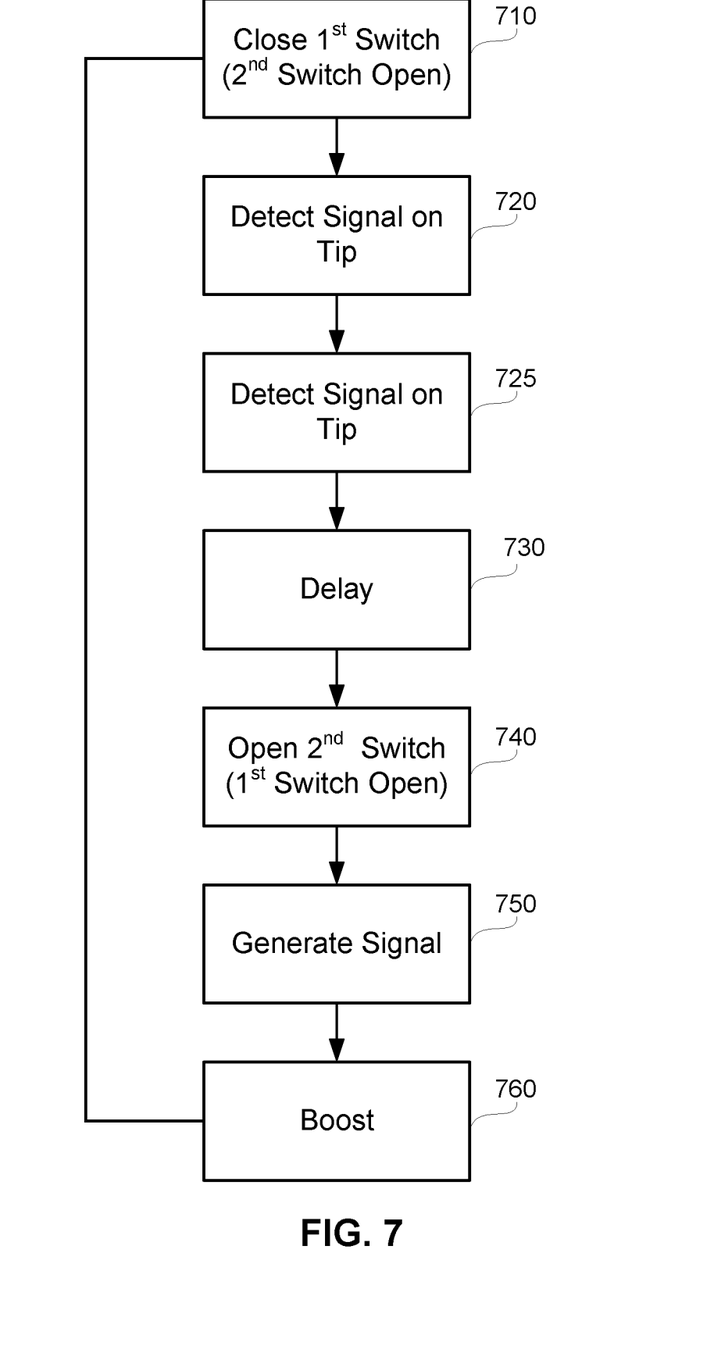
FIG. 7 is a simplified flow chart of an exemplary method for creating a touch effect with a stylus in accordance with some embodiments of the present disclosure.

Reference is now made to FIG. 6 is a simplified diagram of another exemplary stylus circuit connected to a tip of the stylus and to FIG. 7 showing a simplified flow chart of an exemplary method for creating a touch effect with a stylus, both in accordance with some embodiments of the present disclosure. In some exemplary embodiments, digital components are added to the circuit of a stylus for producing a touch effect during mutual capacitive detection. The circuit includes a first switch 610 that connects tip 20 to receive circuit including TIA 300 and signal detection component 640 and to a second switch that connects tip 20 to circuit components that generate and transmit a signal based on the signal that was previously detected. Switches 610 and 620 are typically not closed at the same time so that a period of detection is separated from a period of transmission. Separating detection and transmission avoids self-oscillation of the stylus circuit. Typically, timer 630 toggles between switches 610 and 620 plurality of times during a single mutual detection frame, e.g. over a single refresh cycle.

While switch 610 is closed (block 710), TIA waits to picks up charge on tip 20 from driver line 210 (block 720). Once amplitude is above a defined threshold, amplitude, frequency and phase of the signal is extracted over one or more cycles of the detected signal (block 725). Optionally, the signal is also recorded to support multiple frequency digitizer systems. Timer 630 imposes a delay that equals a desired phase shift, e.g. a 180 degree phase shift for a signal to be transmitted from tip 20 to the digitizer sensor (block 730). After the delay switch 620 is closed (and switch 610 is opened) (block 740). A signal generator 650 generates a signal based on the frequency and phase detected by signal detector 640 (block 750). Typically, the signal generated is a low voltage digital signal. The generated signal is transmitted to tip 20 through a booster 660 (block 760). The gain of the booster may be adjusted based on amplitude extracted with signal detection component 640. Optionally, the gain may be modulated based on output from tip pressure sensor 400 that senses pressure applied on tip 20. Other information may be encoded with booster 660 such as stylus identity. In some exemplary embodiments, encoded information is only added to the transmitted signal when the stylus receives indication, e.g. via an uplink channel that the digitizer system supports decoding the information transmitted. Typically, switch 620 is controlled by timer 630 and remains closed for a pre-defined time period. At the end of the pre-defined duty cycle, switch 620 is opened and switch 610 is optionally closed. Typically, this cycle is repeated a plurality of times during mutual capacitive detection.

Figure 8:
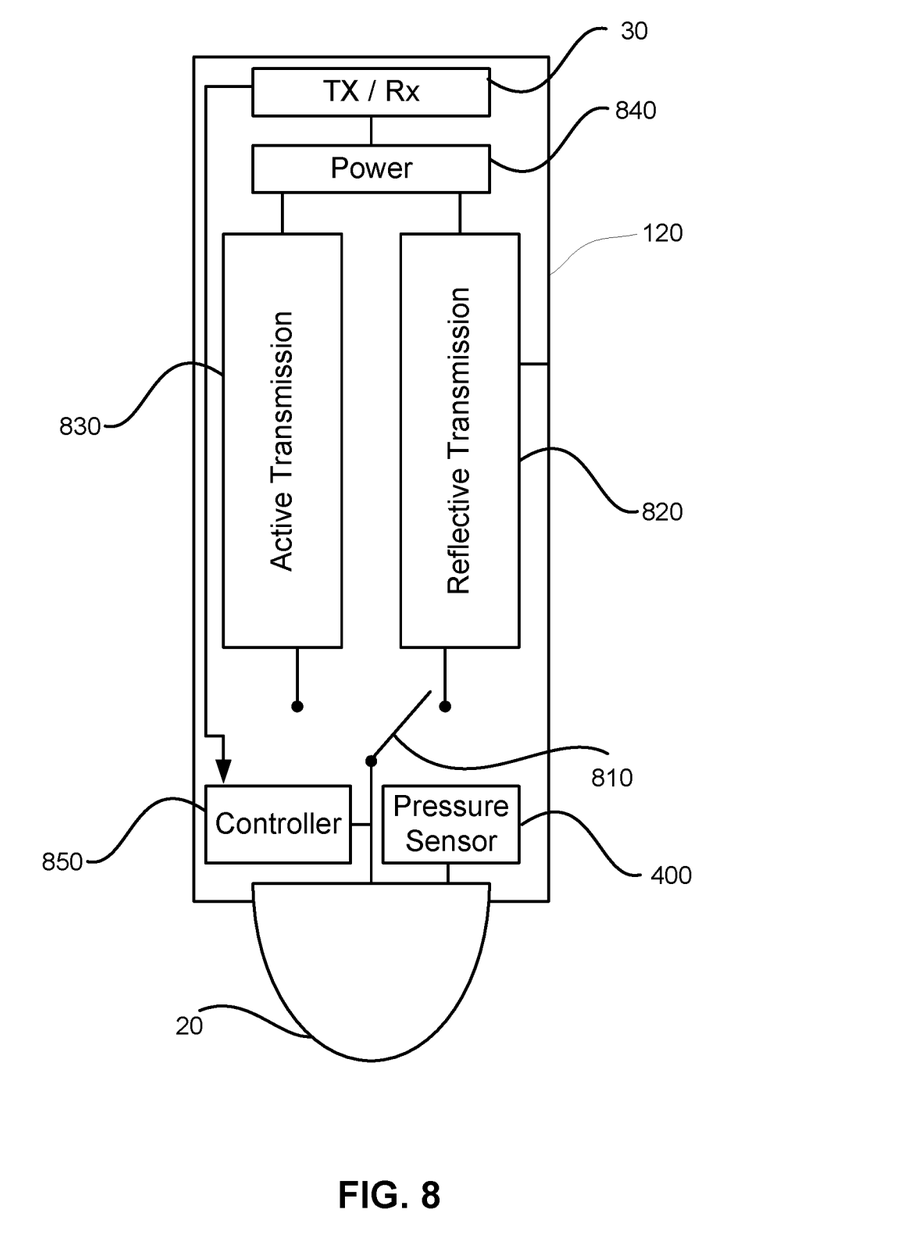
FIG. 8 is a simplified block diagram of an exemplary stylus that provides input to a digitizer sensor using one of two different transmission modes in accordance with some embodiments of the present disclosure.

FIG. 8 is a simplified block diagram of an exemplary stylus that provides input to a digitizer sensor using one of two different transmission modes in accordance with some embodiments of the present disclosure. In some exemplary embodiments, stylus 120 can selectively transmit in one of two transmission modes: an active transmission mode and a reflective transmission mode. Typically, each of active transmission circuit 830 and a reflective transmission circuit 820 are powered by an internal power supply 840 of stylus 120. A switch 810 connects one of the two transmission circuits to tip 20 of stylus 120. Typically, a position of switch 810 is controlled by a controller 850 of stylus 120.

In some exemplary embodiments, switch 810 toggles between the two transmission modes based on input from pressure sensor 400. Reflective transmission can be applied while tip 20 is pressing against digitizer sensor 50 and active transmission circuit can be applied while tip 20 is hovering. Switch 810 may connect active transmission circuit 830 to tip 20 when the tip pressure falls below a defined threshold or when there is no pressure detected. If the digitizer system does not support active transmission, stylus input will continue to be tracked while a threshold pressure is applied on tip 20.

In another exemplary embodiment, switch 810 is adapted to toggle between the transmission circuits based on a defined duty cycle. For example, reflective transmission is applied during a period slotted for mutual capacitive detection and active transmission is applied during other periods in the digitizer sensor's refresh cycle. Optionally, information regarding pressure applied tip 20 is transmitted during the reflective transmission mode and a position signal for detecting position of the stylus is transmitted during active transmission. Optionally, pressure information is also transmitted during the active transmission mode or transmitted only in the active transmission mode.

In some exemplary embodiments, input received from a host 22 via a wireless communication module 30 provides input to controller 850 to controls position of switch 810. A default position of switch 810 may be to connect tip 20 to reflective transmission circuit 820. When stylus 120 receives indication that active transmission can be supported, switch 810 disconnects the reflective transmission circuit 820 and connects tip 20 to the active transmission circuit and disconnect the tip to the reflective transmission circuit 820.

Optionally, one of the two transmission modes is selected during manufacturing and position of switch 810 is permanently set at the manufacturing site.

According to an aspect of some exemplary embodiments, there is provided a handheld device comprising: a conductive tip configured to pick up charge based on a drive signal transmitted on a digitizer sensor over a pre-defined duration; a first circuit comprising: an amplifier configured to convert the charge on the conductive tip to voltage; and a signal detector configured to detect output from the amplifier and to extract parameters of the output; a second circuit comprising: a signal generator configured to generate a signal based on the parameters extracted; and a booster configured to boost the signal generated with an amplitude based on the parameters extracted to be transmitted via the conductive tip; a switch configured to connect one of the first circuit and the second circuit to the conductive tip; and a controller configured to toggle position of the switch a plurality of times during the pre-defined duration.

Optionally, the device comprises a pressure sensor configured to sense pressure applied on the conductive tip, wherein the controller is configured to modulate the amplitude based on output from the pressure sensor.

Optionally, the parameters include frequency, phase and amplitude of the signal and wherein the signal generator is configured to generate the signal in the same phase as the output.

Optionally, the parameters include frequency, phase and amplitude of the signal and wherein the signal generator is configured to generate the signal with a 180 degree phase shift from the output.

Optionally, the controller is configured to repeatedly toggle the position of the switch at a defined duty cycle.

Optionally, the controller is configured to modulate amplitude based on identity of the stylus.

According to an aspect of some exemplary embodiments, there is provided a handheld device comprising: a conductive tip; an amplifier having a negative input connected to the conductive tip, the amplifier configured to convert charge on the conductive tip to first voltage; an automatic gain control circuit configured to amplify the first voltage from the amplifier; pressure sensor configured to generate a second voltage that varies with pressure applied on the conductive tip, wherein the second voltage is configured to modulate output of the automatic gain control circuit; a housing, wherein at least portion of the housing is conductive and wherein output from the automatic gain control circuit is connected to the conductive portion of the housing; and a power source configured to power each of the amplifier, automatic gain control circuit and the power source wherein the power source is floating.

Optionally, the amplifier together with the automatic gain control circuit is configured to shift phase of the input to the amplifier by 180 degrees.

Optionally, the amplifier together with the automatic gain control circuit is maintain a same phase as the input to the amplifier.

Optionally, the first voltage is modulated to include identity of the stylus.

According to an aspect of some exemplary embodiments, there is provided a handheld device comprising: a conductive tip configured to interact with a capacitive based digitizer sensor; an active transmission module configured to generate a first signal on the conductive tip independent from a drive signal transmitted on the digitizer sensor; a reflective transmission module configured to generate a second signal on the conductive tip based on the drive signal transmitted on the digitizer sensor and picked by the conductive tip during interaction with the digitizer sensor; a switch configured to connect the conductive tip to one of the active transmission module and the reflective transmission module; and controller configured to toggle position of the switch.

Optionally, the device comprises a pressure sensor for sensing pressure applied on the conductive tip.

Optionally, the controller is configured to toggle a position of the switch based on output from the pressure sensor.

Optionally, the controller is configured to toggle the switch to connect the conductive tip to the reflective transmission module based detecting pressure above a defined threshold.

Optionally, the output from the pressure sensor is configured to modulate amplitude of the second signal.

Optionally, the output from the pressure sensor is encoded on the first signal.

Optionally, the second signal is configured to have a same phase as the drive signal.

Optionally, the device comprises a receiver, wherein the receiver is configured to receive commands from a host computer associated with the digitizer sensor and wherein the controller is configured to control position of the switch based on the commands.

Optionally, the controller is configured to toggle between connecting the conductive tip to the active transmission module and the reflective transmission module based on a defined duty cycle.

Optionally, the controller is configured to toggle between connecting the conductive tip to the active transmission module and the reflective transmission module based on touch signal parameters.

Optionally, the reflective transmission module comprises: a first circuit comprising: an amplifier configured to convert the charge on the conductive tip to voltage; and a signal detector configured to receive amplifier output and to extract parameters of the output; a second circuit comprising: a signal generator configured to generate a signal based on the parameters extracted; and a booster configured to boost the signal generated with an amplitude based on the parameters extracted to be transmitted via the conductive tip; a second switch configured to connect one of the first circuit and the second circuit to the conductive tip; and a controller configured to toggle position of the switch a plurality of times during the pre-defined duration.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A handheld device comprising:
    a conductive tip configured to pick up a charge based on a drive signal transmitted on a digitizer sensor over a pre-defined duration;
    a first circuit comprising:
        an amplifier configured to convert the charge on the conductive tip to voltage; and
        a signal detector configured to detect output from the amplifier and to extract parameters of the output;
    a second circuit comprising:
        a signal generator configured to generate a signal based on the parameters extracted; and
        a booster configured to boost the signal generated with an amplitude based on the parameters extracted to be transmitted via the conductive tip;
    a switch configured to connect one of the first circuit and the second circuit to the conductive tip; and
    a controller configured to toggle position of the switch a plurality of times during the pre-defined duration.

2. The handheld device of claim 1, further comprising a pressure sensor configured to sense pressure applied on the conductive tip, wherein the controller is configured to modulate the amplitude based on an output from the pressure sensor.

3. The handheld device of claim 2, wherein the controller is configured to modulate the amplitude to distinguish between a stylus input and a finger input.

4. The handheld device of claim 1, wherein the parameters include frequency, phase and amplitude of the signal and wherein the signal generator is configured to generate the signal in a same phase as the output.

5. The handheld device of claim 1, wherein the controller is configured to repeatedly toggle the position of the switch at a defined duty cycle.

6. The handheld device of claim 1, wherein the amplifier is configured to convert the charge on the conductive tip to a voltage that mimics a finger touch input.

7. The handheld device of claim 1, wherein the amplifier is configured to convert the charge on the conductive tip to a voltage pattern having a phase opposite to a phase of the charge picked up by the conductive tip.

8. The handheld device of claim 1, wherein a second switch is configured to connect one of a third circuit or a fourth circuit to the conductive tip based at least on an operating mode of the conductive tip, the operating mode being one of a reflective transmission mode or an active transmission mode.

9. The handheld device of claim 1, wherein a second switch is configured to connect to a third circuit or a fourth circuit based on a defined tip pressure threshold.

10. The handheld device of claim 1, wherein a position of a second switch is configured to be controlled by an input received from a host via a wireless communication module.

11. A method for controlling a stylus, the method comprising:
    detecting a charge on a conductive tip of the stylus from a driver line;
    extracting a signal upon the detected charge being above a defined threshold, amplitude, frequency and phase;
    imposing a delay representing a phase shift for a control signal to be transmitted from the conductive tip to a digitizer sensor; and
    generating a tip signal based on a frequency and phase of the detected charge, the tip signal transmitted to the conductive tip through a booster.

12. The method of claim 11, further comprising adjusting a gain of the booster based at least on an amplitude of the detected charge.

13. The method of claim 11, further comprising adjusting a gain of the booster based at least on an output from a tip pressure sensor configured to sense a pressure applied to the conductive tip.

14. The method of claim 11, further comprising controlling a switch of the stylus using a timer to generate a pre-defined duty cycle that is repeated a plurality of times during a mutual capacitive detection, the switch being closed after the delay is imposed.

* * * * *